Oct. 9, 1934.        G. S. C. LUCAS         1,976,504
           COUPLING DEVICE FOR ELECTRICAL CIRCUITS
                    Filed July 29, 1930
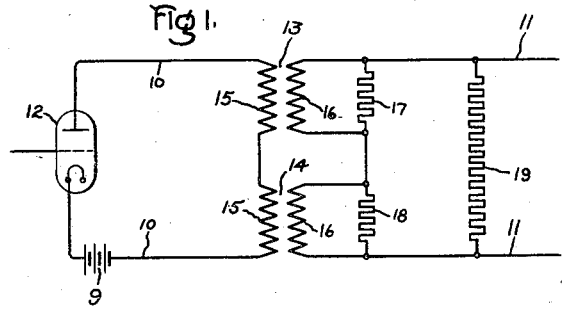
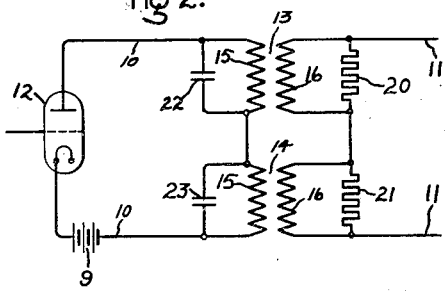
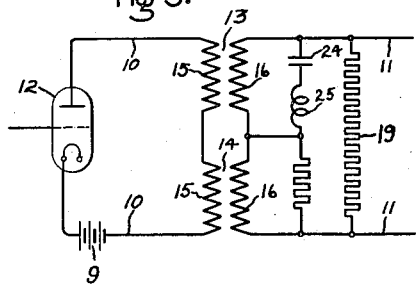
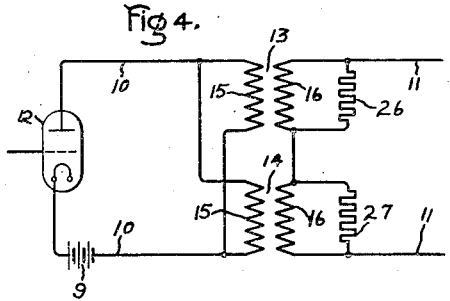
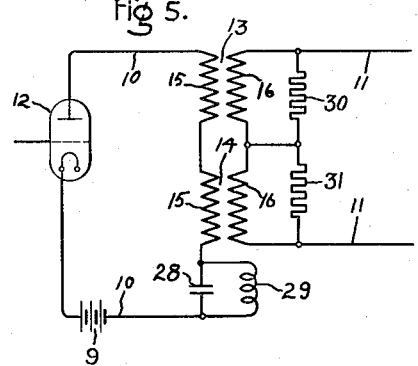
Inventor:
George S. C. Lucas.
by Charles V. Tulla
His Attorney.

Patented Oct. 9, 1934

1,976,504

UNITED STATES PATENT OFFICE 1,976,504

COUPLING DEVICE FOR ELECTRICAL CIRCUITS

George S. C. Lucas, Rugby, England, assignor to General Electric Company, a corporation of New York Application July 29, 1930, Serial No. 471,579
In Great Britain August 28, 1929

3 Claims. (Cl. 178—44)

The present invention relates to coupling devices for electric circuits and more particularly to circuits in which transformers are used as the coupling units. In circuits such as are used for vacuum tube amplifiers and the like it is necessary to design the coupling transformer so that it has a predetermined frequency characteristic. The design of such a transformer is often very difficult and the object of the present invention is to provide an improved coupling unit which will obviate the necessity for a special design and which will overcome this difficulty.

In accordance with the invention, a coupling unit is provided which includes two or more separate transformers connected together with their primary and secondary windings connected in series or parallel to form one unit, the transformers being loaded either separately or jointly or both.

In carrying this invention into effect for example as suitable for a photo-electric cell circuit, two independent transformers may be employed with their windings connected in series. The transformers may have a loading impedance or impedances connected in parallel with them. With this arrangement, by a suitable adjustment of the voltage ratios of the transformers and the loading impedances, practically any desired frequency characteristic may be obtained.

The invention will be better understood from the following description when taken in connection with the accompanying drawing, and its scope will be pointed out in the appended claims.

In the drawing, Fig. 1 is a circuit diagram of a coupling unit employing two transformers provided with suitable circuit connections and circuit impedances in accordance with and embodying the invention; and Figs. 2 to 5 inclusive show modifications of the same coupling unit.

Referring to Fig. 1, 10 and 11 are electrical circuits adapted to be coupled together, circuit 10 of the present example being an output or anode circuit for an electric discharge device 12 which is energized by a suitable source of anode current indicated at 9.

Circuits 10 and 11 are coupled together by a plurality of transformers, represented by two transformers, 13 and 14, of the present example, with their primary windings 15 connected in series with circuit 10 and their secondaries 16 connected in series with circuit 11.

Connected with certain of the windings of the transformers are circuit impedances 17, 18, and 19 connected in parallel with each of the secondary windings and with the circuit 11 respectively, whereby said circuits and secondary windings are loaded to alter the frequency characteristic of the coupling unit. In the present example the loading impedances are simple shunt-connected resistances.

By connecting together as shown at least two transformers having certain frequency characteristics, that is, the ability to transmit a certain frequency or range of frequencies with any desired degree of uniformity and by loading certain of the windings of such transformer, a desired overall frequency characteristic for the coupling unit may be obtained which would be difficult or more costly to obtain through the design of any one transformer.

Referring now to the remaining figures of the drawing showing various modifications of the coupling unit of Fig. 1 transformers 13 and 14 are shown in connection with the output circuit 10 of the electric discharge device 12 and the circuit 11, and the same reference numerals are used throughout for these elements of the circuit.

In Fig. 2, the secondary windings of the transformers are each loaded by circuit impedances such as resistances 20 and 21, and in addition, the primary windings are loaded by circuit impedances such as condensers 22 and 23. The condensers may be arranged to have values whereby the windings with which they are connected may resonate at a certain desired frequency or within a certain range. This will alter the frequency characteristic of the coupling unit whereby it will have a certain desired overall frequency characteristic.

In Fig. 3, the secondary winding of one transformer is loaded by a resonant circuit impedance including a series connected condenser 24 and an inductance 25 while the remainder of the circuit is the same as that of Fig. 1, whereby the overall frequency characteristic of the coupling unit is altered from that of Fig. 1 to have certain other and desired characteristics.

With certain types of coupling transformers it may be desirable, for the purpose of securing a desired overall characteristic, to connect certain of the transformer windings in parallel as indicated in Fig. 4 in which the primary windings are so connected while the secondary windings are loaded after the manner of those of Fig. 2 by impedance devices in the form of resistances 26 and 27, representing any suitable circuit impedance or loading device for such windings.

It will be appreciated that in addition to the secondary loads on the transformers, the primary or primaries may be loaded by suitable circuit impedance means other than those shown in connection with Fig. 2. For example, the primary windings may be loaded or tuned to resonance as indicated in Fig. 5 by means of a resonant circuit device including a condenser 28 and an inductance 29 parallel connected and inserted in the circuit 10 whereby it is connected with the primary winding for altering the frequency characteristic of the coupling unit whereby the overall characteristic will have a desired value. In this connection it should be pointed out that the secondary load may include resistors 30 and 31 or resonant circuits such as the resonant circuit 24—25 indicated in connection with the secondary of transformer 13 in Fig. 3.

In case resistors, as 30 and 31, are employed instead of resonant circuit devices for altering the frequency characteristic of the coupling unit, the normally peaked characteristic of each of the transformers constituting the coupling unit will be broadened and flattened. By choosing the proper values of resistance for these resistors the overall frequency characteristic of the coupling unit may, through merely this simple resistance loading means, be made to assume the form of any one of a number of curves which are relatively low and flattened as compared to the series of peaked curves normal to the separate transformers. The frequency characteristic of the unit may for example be made such that a broad band of frequencies is transmitted at substantially equal efficiency for all frequencies of the band.

The transformers may have separate windings as shown or they may be auto transformers, and it should further be understood that while the invention has been illustrated and described in connection with a coupling device having two transformers, such devices may employ any number of transformers which may be required to effect the desired overall frequency characteristic of the coupling unit and that various combinations of the circuit impedances will be readily apparent to those skilled in the art in connection therewith.

What I claim as new and desire to secure by Letters Patent of the United States is:

1. In a coupling unit for two electrical circuits adapted to be coupled together for the transmission of a range of frequencies in an alternating current, at least two transformers having primary windings connected in series in one of said circuits and secondary windings connected in series in the other of said circuits, and means for causing said coupling unit to transmit a relatively broad band of frequencies at predetermined efficiencies throughout said band of frequencies, said means comprising a resistor connected in parallel with one of said transformers for broadening and flattening to a predetermined degree the frequency characteristic normal to said one of the transformers, said means further comprising a second resistor separate from said first-named resistor connected in parallel with the other of said transformers for broadening and flattening to a predetermined degree the frequency characteristic normal to the other of said transformers.

2. In a coupling unit for two electrical circuits adapted to be coupled together for the transmission of a range of frequencies in an alternating current, a plurality of separate transformers having a group of windings connected in series in one of said circuits and a second group of windings connected in series in the other of said circuits, and means for causing said coupling unit to transmit when the number of said transformers is relatively small a relatively broad band of frequencies at substantially equal efficiency for all frequencies of the band, said means comprising a plurality of separate resistors each connected in parallel with a different one of said transformers, each of said resistors being of such value that the frequency characteristic normal to the corresponding transformers is broadened and flattented to a predetermined degree whereby the overall frequency characteristic of said coupling unit is substantially uniform throughout said frequency band.

3. In a coupling unit for two electrical circuits adapted to be coupled together for the transmission of a range of frequencies in an alternating current, a plurality of separate transformers having primary windings connected in series in one of said circuits and secondary windings connected in series in the other of said circuits, and means for causing said coupling unit when the number of said transformers is relatively small to transmit a relatively broad band of frequencies at substantially equal efficiency for all frequencies of said band, said means comprising a plurality of separate resistors each connected in parallel with a different one of said secondary windings, each of said resistors being of such value that the frequency characteristic normal to the corresponding transformer is broadened and flattened to a predetermined degree whereby the overall frequency characteristic of said coupling unit is substantially uniform throughout said frequency band.

GEORGE S. C. LUCAS.